(12) United States Patent
Kray et al.

(10) Patent No.: US 12,410,728 B2
(45) Date of Patent: Sep. 9, 2025

(54) HYBRID COMPOSITE COMPONENTS

(71) Applicant: General Electric Company, Schenectady, NY (US)

(72) Inventors: Nicholas Joseph Kray, Mason, OH (US); Nitesh Jain, Bangalore (IN)

(73) Assignee: General Electric Company, Evandale, OH (US)

( * ) Notice: Subject to any disclaimer, the term of this patent is extended or adjusted under 35 U.S.C. 154(b) by 0 days.

(21) Appl. No.: 18/330,841

(22) Filed: Jun. 7, 2023

(65) Prior Publication Data

US 2024/0076997 A1 Mar. 7, 2024

Related U.S. Application Data

(62) Division of application No. 17/210,845, filed on Mar. 24, 2021, now abandoned.

(51) Int. Cl.
*F01D 21/04* (2006.01)
*F01D 25/24* (2006.01)
*F02K 3/06* (2006.01)

(52) U.S. Cl.
CPC .......... *F01D 21/045* (2013.01); *F01D 25/24* (2013.01); *F02K 3/06* (2013.01); *F05D 2220/36* (2013.01); *F05D 2240/14* (2013.01); *F05D 2300/603* (2013.01)

(58) Field of Classification Search
CPC .... F01D 21/045; F01D 25/24; F05D 2220/36; F05D 2240/14; F05D 2300/603; F05D 2300/6033; F05D 2300/121; F05D 2300/124; F05D 2300/171; F05D 2300/173; F05D 2300/174
See application file for complete search history.

(56) References Cited

U.S. PATENT DOCUMENTS

| | | |
|---|---|---|
| 4,063,847 A | 12/1977 | Simmons |
| 4,897,126 A | 1/1990 | Bretz et al. |
| 5,133,931 A | 7/1992 | Cho |
| 5,229,196 A | 7/1993 | Seibold et al. |
| 5,362,347 A | 11/1994 | Domine |
| 5,422,066 A | 6/1995 | Webster |
| 5,439,536 A | 8/1995 | Cho |
| 5,676,733 A | 10/1997 | Kohr |

(Continued)

FOREIGN PATENT DOCUMENTS

| | | |
|---|---|---|
| BR | PI0713700 A2 | 10/2012 |
| BR | PI0716761 A2 | 9/2013 |

(Continued)

*Primary Examiner* — Brian P Wolcott
(74) *Attorney, Agent, or Firm* — McGarry Bair PC (57) ABSTRACT

Hybrid composite components, such as gas turbine engine containment assemblies, a hybrid composite component having an annular composite shell and an annular metallic shell joined with the composite shell. A containment assembly including a containment case extending along an axial direction about a longitudinal centerline of the gas turbine engine. The containment case has an inner surface and an outer surface spaced apart along a radial direction and includes a first composite shell joined with a metallic shell. The metallic shell defining a first portion of the inner surface and the first composite shell defining a second portion of the inner surface.

20 Claims, 6 Drawing Sheets

(56) References Cited

U.S. PATENT DOCUMENTS

| | | | |
|---|---|---|---|
| 7,402,022 B2* | 7/2008 | Harper | F01D 21/045 |
| | | | 415/214.1 |
| 7,753,312 B2 | 7/2010 | Schmidt et al. | |
| 7,955,713 B2 | 6/2011 | Roebroeks et al. | |
| 8,905,709 B2* | 12/2014 | Dziech | F01D 25/246 |
| | | | 415/173.1 |
| 9,140,140 B2 | 9/2015 | McMillan | |
| 9,248,612 B2 | 2/2016 | Zhu et al. | |
| 9,429,039 B2 | 8/2016 | Finlayson | |
| 9,903,228 B2 | 2/2018 | Durie et al. | |
| 9,915,225 B2 | 3/2018 | Eckett et al. | |
| 10,077,678 B2 | 9/2018 | Hannecart | |
| 10,166,708 B2 | 1/2019 | Magnaudeix et al. | |
| 10,598,022 B1 | 3/2020 | Kannangara et al. | |
| 10,815,804 B2 | 10/2020 | Sakala et al. | |
| 11,008,887 B2* | 5/2021 | Hall | F01D 25/26 |
| 11,118,511 B2* | 9/2021 | Finlayson | B64D 33/00 |
| 2010/0133380 A1 | 6/2010 | Roebroeks et al. | |
| 2012/0091780 A1 | 4/2012 | Müller | |
| 2012/0098322 A1 | 4/2012 | Müller | |
| 2015/0314556 A1 | 11/2015 | Xie et al. | |
| 2016/0003060 A1 | 1/2016 | Cook | |
| 2016/0003062 A1 | 1/2016 | Murdock | |
| 2017/0198606 A1 | 7/2017 | Nelboeck et al. | |
| 2017/0198714 A1 | 7/2017 | Lin et al. | |
| 2018/0080339 A1 | 3/2018 | Kray et al. | |
| 2018/0283397 A1* | 10/2018 | Sakala | F01D 9/041 |
| 2020/0011203 A1* | 1/2020 | Prabhakar | F01D 25/005 |
| 2020/0123924 A1* | 4/2020 | Finlayson | F02K 3/06 |
| 2020/0200038 A1* | 6/2020 | Hall | F01D 25/243 |

FOREIGN PATENT DOCUMENTS

| | | |
|---|---|---|
| CA | 2473350 C | 11/2011 |
| CN | 105648283 B | 1/2018 |
| CN | 108691810 A | 10/2018 |
| EP | 0529917 B1 | 11/1994 |
| EP | 1965935 A1 | 9/2008 |
| EP | 2411277 A2 | 2/2012 |
| EP | 2964895 A1 | 1/2016 |
| EP | 2964895 A1 | 1/2016 |
| EP | 2261386 B1 | 3/2019 |
| EP | 2964893 B1 | 10/2020 |
| JP | H1147959 A | 2/1999 |
| JP | 2012521916 A | 9/2012 |
| JP | 2012521917 A | 9/2012 |

\* cited by examiner

HYBRID COMPOSITE COMPONENTS

CROSS REFERENCE TO RELATED APPLICATION(S)

This application is a divisional of U.S. patent application Ser. No. 17/210,845, filed Mar. 24, 2021, which is incorporated herein in its entirety.

FIELD

The present subject matter relates generally to hybrid composite components. More particularly, the present subject matter relates to casings, such as fan case containment systems of gas turbine engines, formed from hybrid composite materials.

BACKGROUND

Aircraft gas turbine engines operate in various conditions and foreign objects may be ingested into the engine. During operation of the engine and, in particular, during movement of an aircraft powered by the engine, the fan blades may be impacted and damaged by foreign objects such as birds or debris picked up on a runway. Impacts on the fan blades may damage the blades and result in blade fragments or entire blades being dislodged and flying radially outward at relatively high velocity.

To limit or minimize damage from dislodged blades or blade fragments, some known engines include a metallic or composite casing or shell to facilitate increasing a radial and an axial stiffness of the engine and to facilitate reducing stresses near the engine casing penetration. To provide blade containment, most of the kinetic energy from a released blade or blade fragment must be absorbed by the casing or shell material. For smaller diameter engines, adequate containment capability may be achieved with a metallic "hardwall" case thick enough to resist penetration by blade fragments. A layer of composite material, such as a graphite epoxy polymer matrix composite, may be applied to the outer surface of the metallic case to bolster the containment ability of the case. Thus, the metal and composite elements of the case are separate layers.

However, for larger diameter engines, a metallic case thick enough to resist penetration is prohibitively heavy. Therefore, either composite hardwall systems (which utilize a composite case rather than a metallic case) or composite "softwall" containment systems may be used for larger diameter engines. In a softwall system, a lightweight, high strength ballistic fabric, such as a fabric formed from aromatic polyamide fibers (e.g., Kevlar®), may be wrapped in multiple layers around a relatively thin support structure. In operation, a separated blade or blade fragment locally penetrates the support structure and strikes the fabric. The fabric layers are intended to capture and contain the blade or blade fragment. Conventional support structures may be fabricated of aluminum or fiber-reinforced composites based on weight considerations, e.g., the support structure may include aluminum honeycomb structures. Thus, like typical hardwall containment systems, typical softwall containment systems may utilize separate layers of metal and composite materials to form the containment case.

Layering metal materials and composite materials in a containment system, in the manner typically utilized in hardwall and softwall containment systems, can increase the weight and cost of the engine in which the containment system is used. Further, all metallic containment systems or all composite (e.g., carbon) containment systems also can be relatively heavy and/or costly. Accordingly, improved containment casings or shells for gas turbine engines would be desirable. For instance, increasing the strength and energy absorption of containment assemblies without unduly increasing the weight and/or cost of the containment system would be desirable.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first," "second," and "third" may be used interchangeably to distinguish one component from another and are not intended to signify location or importance of the individual components. The terms "forward" and "aft" refer to relative positions within a gas turbine engine or vehicle and refer to the normal operational attitude of the gas turbine engine or vehicle. For example, with regard to a gas turbine engine, forward refers to a position closer to an engine inlet and aft refers to a position closer to an engine nozzle or exhaust. The terms "upstream" and "downstream" refer to the relative direction with respect to fluid flow in a fluid pathway. For example, "upstream" refers to the direction from which the fluid flows, and "downstream" refers to the direction to which the fluid flows. The terms "coupled," "fixed," "attached to," and the like refer to both direct coupling, fixing, or attaching, as well as indirect coupling, fixing, or attaching through one or more intermediate components or features, unless otherwise specified herein. The singular forms "a," "an," and "the" include plural references unless the context clearly dictates otherwise.

Further, as used herein, the terms "axial" or "axially" refer to a dimension along a longitudinal axis of an engine. The term "forward" used in conjunction with "axial" or "axially" refers to a direction toward the engine inlet, or a component being relatively closer to the engine inlet as compared to another component. The term "aft" or "rear" used in conjunction with "axial" or "axially" refers to a direction toward the engine exhaust, or a component being relatively closer to the engine exhaust as compared to another component. The terms "radial" or "radially" refer to a dimension extending between a center longitudinal axis (or centerline) of the engine and an outer engine circumference. Radially inward is toward the longitudinal axis and radially outward is away from the longitudinal axis.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value, or the precision of the methods or machines for constructing or manufacturing the components and/or systems. The approximating language may refer to being within a +/−1, 2, 4, 10, 15, or 20 percent margin in either individual values, range(s) of values, and/or endpoints defining range(s) of values.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Generally, the present subject matter provides hybrid composite components, i.e., components formed from a metallic segment integrated with a composite segment. The metallic segment may be a metallic shell, such as a single piece annular shell or a segmented annular shell formed from a plurality of interlocking metallic panels. The composite segment includes an annular composite shell. In some embodiments, the metallic shell interlocks with one or more composite shells to form the hybrid composite component. In other embodiments, the metallic shell is attached to the composite shell using a plurality of attachment mechanisms to form the hybrid composite component. Methods for forming hybrid composite components also are provided.

Figure 1:
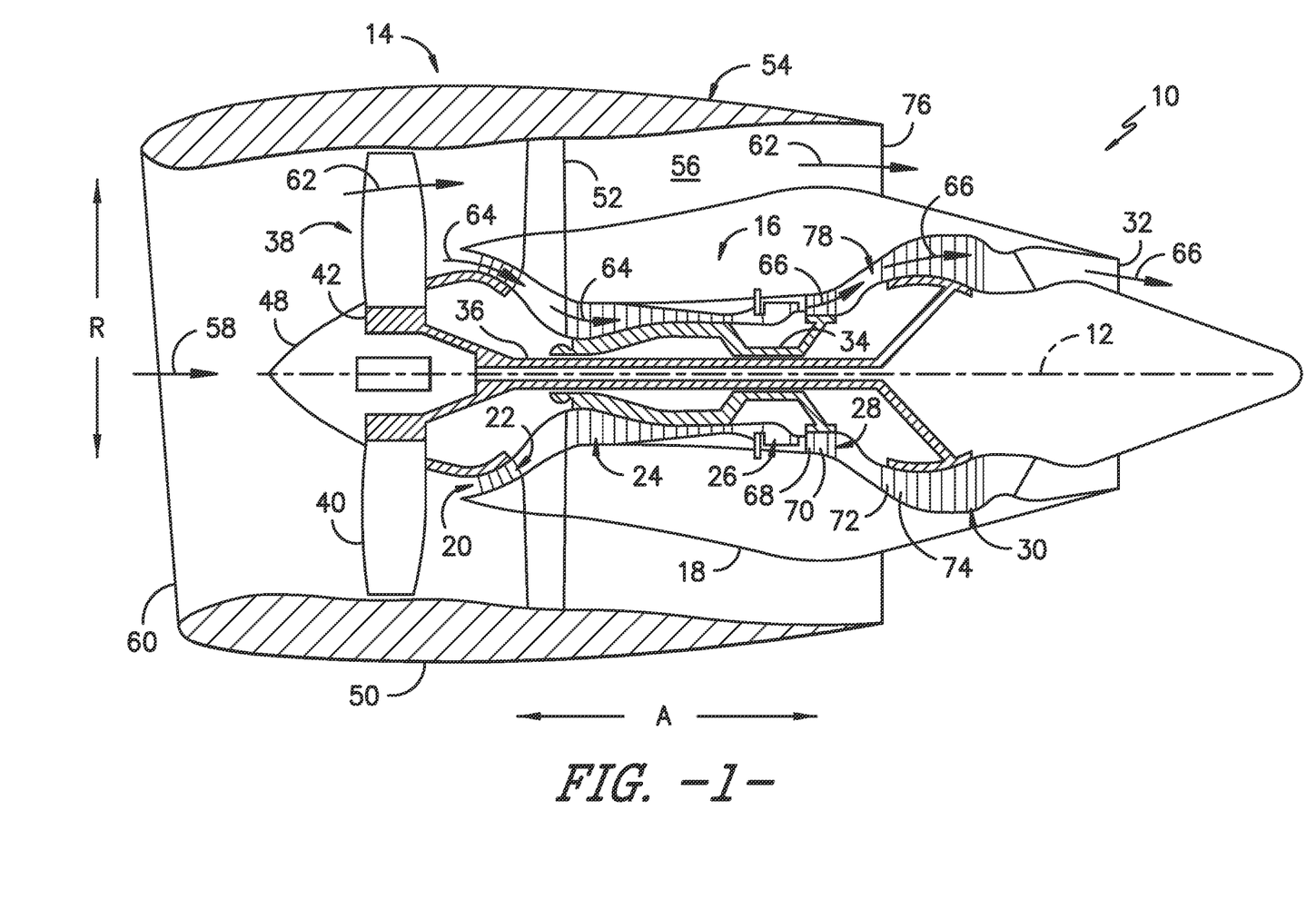
FIG. 1 provides a schematic cross-section view of an exemplary gas turbine engine according to various embodiments of the present subject matter.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the depicted embodiment, fan section 14 includes a fan 38 having a plurality of fan blades 40 coupled to a disk or hub 42 in a spaced apart manner. As depicted, fan blades 40 extend outward from disk 42 generally along the radial direction R. The fan blades 40 and disk 42 are together rotatable about the longitudinal centerline 12 by LP shaft 36. In some embodiments, a power gear box having a plurality of gears may be included for stepping down the rotational speed of the LP shaft 36 to a more efficient rotational fan speed.

Referring still to the exemplary embodiment of FIG. 1, disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that fan case (nacelle) 50 may be configured to be supported relative to the core turbine engine 16 by a plurality of circumferentially-spaced outlet guide vanes 52. Moreover, a downstream section 54 of the fan case 50 may extend over an outer portion of the core turbine engine 16 so as to define a bypass airflow passage 56 therebetween.

During operation of the turbofan engine 10, a volume of air 58 enters turbofan 10 through an associated inlet 60 of the fan case 50 and/or fan section 14. As the volume of air 58 passes across fan blades 40, a first portion of the air 58 as indicated by arrows 62 is directed or routed into the bypass airflow passage 56 and a second portion of the air 58 as indicated by arrows 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

In some embodiments, components of the turbofan engine 10 may comprise a composite material, such as a polymer matrix composite (PMC) material or a ceramic matrix composite (CMC) material, which has high temperature capability. Composite materials generally comprise a fibrous reinforcement material embedded in matrix material, e.g., a polymer or ceramic matrix material. The reinforcement material serves as a load-bearing constituent of the composite material, while the matrix of a composite material serves to bind the fibers together and act as the medium by which an externally applied stress is transmitted and distributed to the fibers.

PMC materials are typically fabricated by impregnating a fabric or unidirectional tape with a resin (prepreg), followed by curing. Prior to impregnation, the fabric may be referred to as a "dry" fabric and typically comprises a stack of two or more fiber layers (plies). The fiber layers may be formed of a variety of materials, nonlimiting examples of which include carbon (e.g., graphite), glass (e.g., fiberglass), polymer (e.g., aromatic polyamide or Kevlar®) fibers, and metal fibers. Fibrous reinforcement materials can be used in the form of relatively short chopped fibers, generally less than two inches in length, and more preferably less than one inch, or long continuous fibers, the latter of which are often used to produce a woven fabric or unidirectional tape. PMC materials can be produced by dispersing dry fibers into a mold, and then flowing matrix material around the reinforcement fibers, or by using prepreg. For example, multiple layers of prepreg may be stacked to the proper thickness and orientation for the part, and then the resin may be cured and solidified to render a fiber reinforced composite part. Resins for PMC matrix materials can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermoplastic resins include nylons, thermoplastic polyesters, polyaryletherketones, and polycarbonate resins. Specific examples of high performance thermoplastic resins that have been contemplated for use in aerospace applications include polyetheretherketone (PEEK), polyetherketoneketone (PEKK), polyetherimide (PEI), and polyphenylene sulfide (PPS). In contrast, once fully cured into a hard rigid solid, thermoset resins do not undergo significant softening when heated but, instead, thermally decompose when sufficiently heated. Notable examples of thermoset resins include epoxy, bismaleimide (BMI), and polyimide resins.

In some embodiments, the "dry" fabric (i.e., an unimpregnated fabric) may be used as one or more layers of a component of the turbofan engine 10. For instance, a fabric may be formed from fibers of carbon, glass, polymer, and/or metal as described above. Without impregnating the fabric with a resin, layers of the fabric may be wrapped about other segments of the component, e.g., to impart certain characteristics to the component due to the fibers used to form the fabric.

As described in greater detail herein, the fan section 14 of the engine 10 includes a fan containment case assembly that includes the fan case 50 and that circumscribes and surrounds the fan 38 and the fan blades 40 to retain any fan blades 40 or fan blade fragments dislodged from the engine fan 38. A "blade-out event" or a fan blade-out (FBO) event arises when a fan blade or portion thereof is accidentally released from a rotor of a high-bypass turbofan engine. When suddenly released during flight, a fan blade can impact a surrounding fan case with substantial force, sometimes penetrating the fan case and travelling into the fan containment case assembly.

Figure 2:
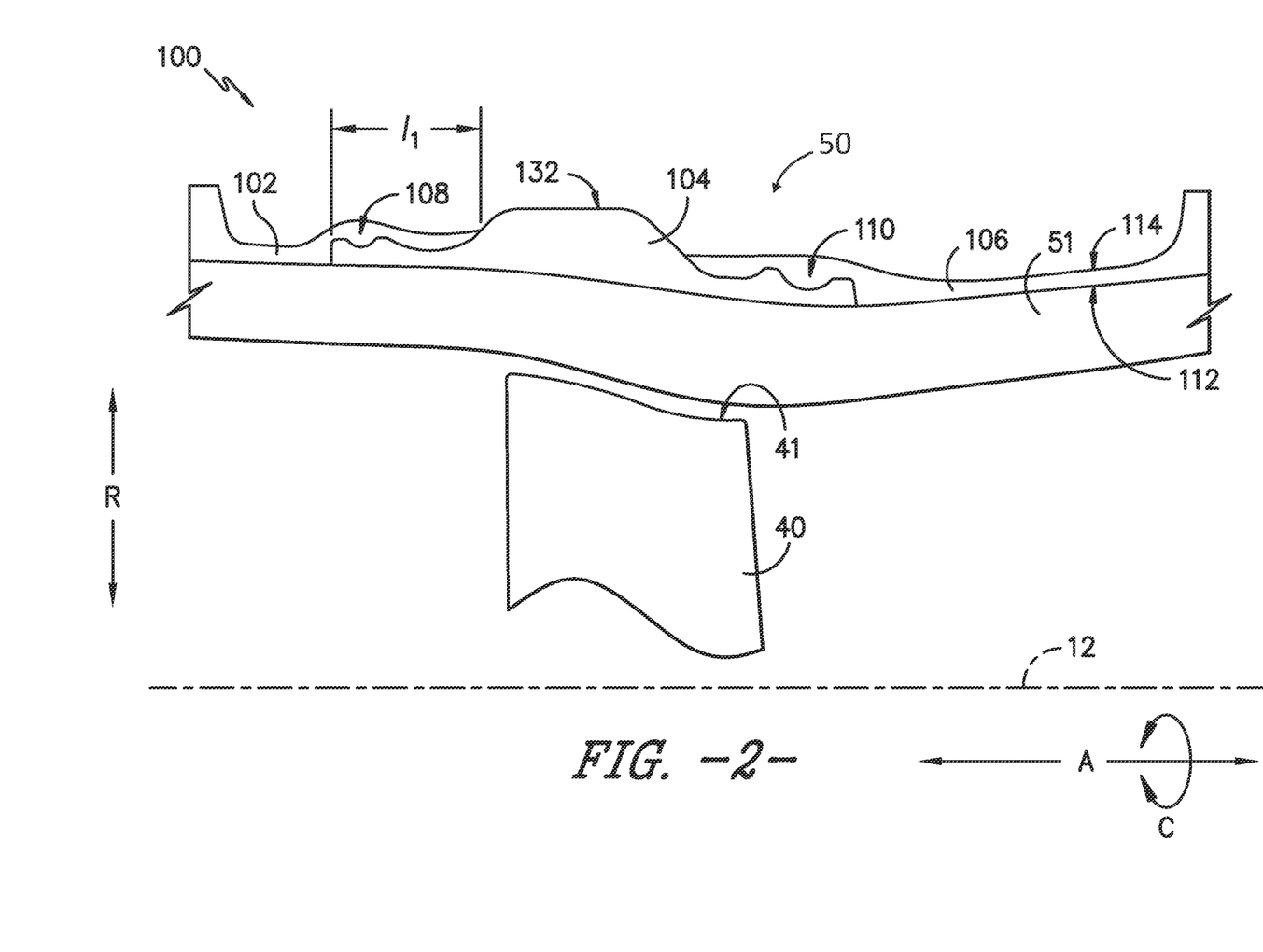
FIG. 2 provides a schematic cross-section view of a fan containment case assembly according to an exemplary embodiment of the present subject matter.

Referring to FIG. 2, a fan containment case assembly 100 is shown according to an exemplary embodiment of the present subject matter. The fan containment case assembly 100 includes the fan case 50, which extends along the axial direction A such that the fan case 50 is disposed about the longitudinal centerline 12 (FIG. 1), and may include an abradable layer, such as a trench filler 51, on the interior of the fan case 50. The abradable layer, e.g., trench filler 51, mitigates the effects of blade rub by forming a seal between the tips 41 of the plurality of fan blades 40 and the fan case 50. For instance, the trench filler 51 may be joined to the fan case 50 such that, within the assembly 100, the trench filler 51 is disposed radially inward of the fan case 50. That is, the trench filler 51 is disposed along the radial direction R between the fan case 50 and the plurality of fan blades 40 such that the fan blades 40 may rub against the trench filler 51 rather than the fan case 50. The fan case 50 forms a radially outermost portion of the fan containment case assembly 100, helping contain objects travelling outward from continuing to travel beyond the fan section 14. Accordingly, the fan case 50 also may be referred to as containment case 50.

As described herein with respect to various embodiments, the fan or containment case 50, or another component of the gas turbine engine 10 such as a compressor casing or the like, may be formed from both a metallic material and a composite material. More particularly, the component (e.g., fan case 50) has a metallic portion and a composite portion, which may be integrated such that the component is referred to as a hybrid composite component. Thus, the fan case or containment case 50 having a metallic portion and a composite portion as described herein may be referred to as a hybrid composite fan or containment case 50.

As shown in the exemplary embodiment of FIG. 2, the containment case 50 includes an annular first composite shell 102 (the composite portion) joined with an annular metallic shell 104 (the metallic portion). The illustrated containment case 50 also includes an annular second composite shell 106 joined with the metallic shell 104. The first composite shell 102 is joined with the metallic shell 104 along a forward edge 108 of the metallic shell 104, and the second composite shell 106 is joined with the metallic shell 104 along an aft edge 110 of the metallic shell 104. For example, as illustrated in FIG. 2, each of the forward edge 108 and the aft edge 110 may define a recess that receives a projection extending from the respective composite shell 102, 106. It will be appreciated that the forward edge 108 is spaced apart from the aft edge 110 along the axial direction A, with the forward edge 108 disposed upstream (with respect to the airflow through the fan section 14) relative to the aft edge 110.

In some embodiments, each of the forward edge 108 and the aft edge 110 of the metallic shell 104 is embedded within the respective composite shell 102, 106, i.e., the forward edge 108 is embedded within the first composite shell 102 and the aft edge 110 is embedded within the second composite shell 106. The metallic shell 104 may be embedded within the composite shells 102, 106, e.g., by laying up layers of composite material to form each composite shell 102, 106 with the respective edge 108, 110 of the metallic shell 104 disposed between the composite layers.

The composite shells 102, 106 may be joined with the metallic shell 104 in other ways as well, such as through a plurality of attachment mechanisms 124 extending through both a respective composite shell 102, 106 and the metallic shell 104 as described in greater detail below. In any event, the metallic shell 104 interlocks with the first composite shell 102 along the circumferential direction C, i.e., about the longitudinal centerline 12. Further, the metallic shell 104 interlocks with the second composite shell 106 along the circumferential direction C or about the longitudinal centerline 12. For instance, as shown in FIG. 2, the first composite shell 102 interlocks with the metallic shell 104 along the forward edge 108 of the shell 104, and the second composite shell 106 interlocks with the metallic shell 104 along the aft edge 110 of the shell 104. More particularly, the composite shells 102, 106 interlock circumferentially with the metallic shell 104, i.e., along an axial length $l_1$ over a circumference of the containment case 50, such that at least one segment of the metallic shell 104 is configured to interlock with a composite shell 102, 106. The interlocking shells 102, 104, 106 are, thus, integrated to form the containment case 50 such that the containment case 50 is an integral metal and composite structure. As used herein, the term "interlock" includes to engage two or more pieces, components, or parts with each other by overlapping or by the fitting together of projections and recesses or the like.

Further, the containment case 50 has an inner surface 112 and an outer surface 114 spaced apart along the radial direction R. The metallic shell 104 defines a first portion of the inner surface 112, the first composite shell 102 defines a second portion of the inner surface 112, and the second composite shell 106 defines a third portion of the inner surface 112. That is, the inner surface 106 is defined by both the metallic shell 104 and the composite shells 102, 106. The composite shells 102, 106 further define portions of the outer surface 114. In the exemplary embodiment of FIG. 2, the metallic shell 104 also defines a portion of the outer surface 114 of the containment case 50.

Figure 3:
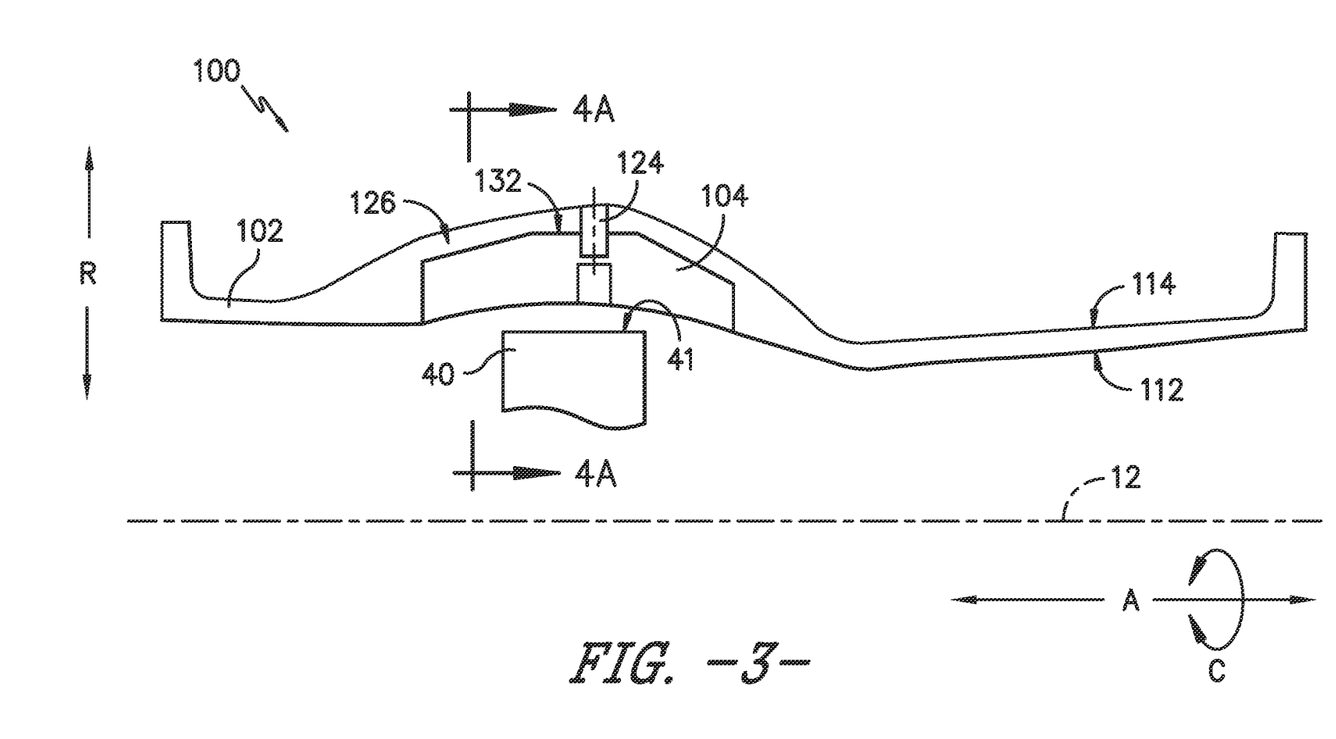
FIG. 3 provides a schematic cross-section view of a fan containment case assembly according to another exemplary embodiment of the present subject matter.

Referring to FIG. 3, a fan containment case assembly 100 is shown according to another exemplary embodiment of the present subject matter. In the depicted embodiment, the metallic shell 104 is recessed within the composite shell 102 such that the metallic shell 104 is disposed in a recess 126 defined by the composite shell 102 and the composite shell 102 defines the outer surface 114 of the containment case 50. Moreover, the metallic shell 104 and the composite shell 102 together define the inner surface 112.

As further illustrated in FIG. 3, in exemplary embodiments, the containment case assembly 100 includes a plurality of attachment mechanisms 124 for joining the composite shell 102 with the metallic shell 104. As shown, each attachment mechanism 124 is disposed between the composite shell 102 and the metallic shell 104 to join the composite shell 102 and the metallic shell 104. In the exemplary embodiment of FIG. 3, each attachment mechanism 124 extends along the radial direction R through both the composite shell 102 and the metallic shell 104 recessed within the composite shell 102 to join the shells 102, 104. In other embodiments, the attachment mechanisms 124 may not extend through the composite shell 102 and the metallic shell 104, e.g., the shells 102, 104 may be glued or brazed together, or the attachment mechanisms 124 may extend along a direction other than the radial direction R, e.g., along the axial direction A or at an angle with respect to the radial direction R. The shells 102, 104 may be bolted together or attached via studs, such that the plurality of attachment mechanisms 124 comprises a plurality of bolts or studs, or as stated, the shells 102, 104 may be glued, brazed, or otherwise joined to one another, such as by laying up the metallic shell 104 with layers of a composite material forming the composite shell 102 as described with respect to FIG. 2.

Figure 4A:
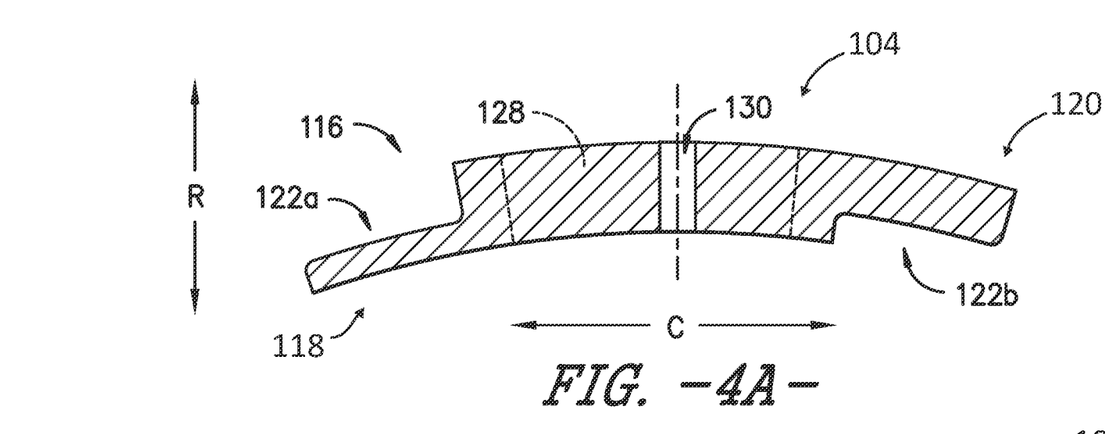
FIG. 4A provides a schematic cross-section view of a metallic panel, taken along the line 4A-4A in FIG. 3, according to an exemplary embodiment of the present subject matter.
Figure 4B:
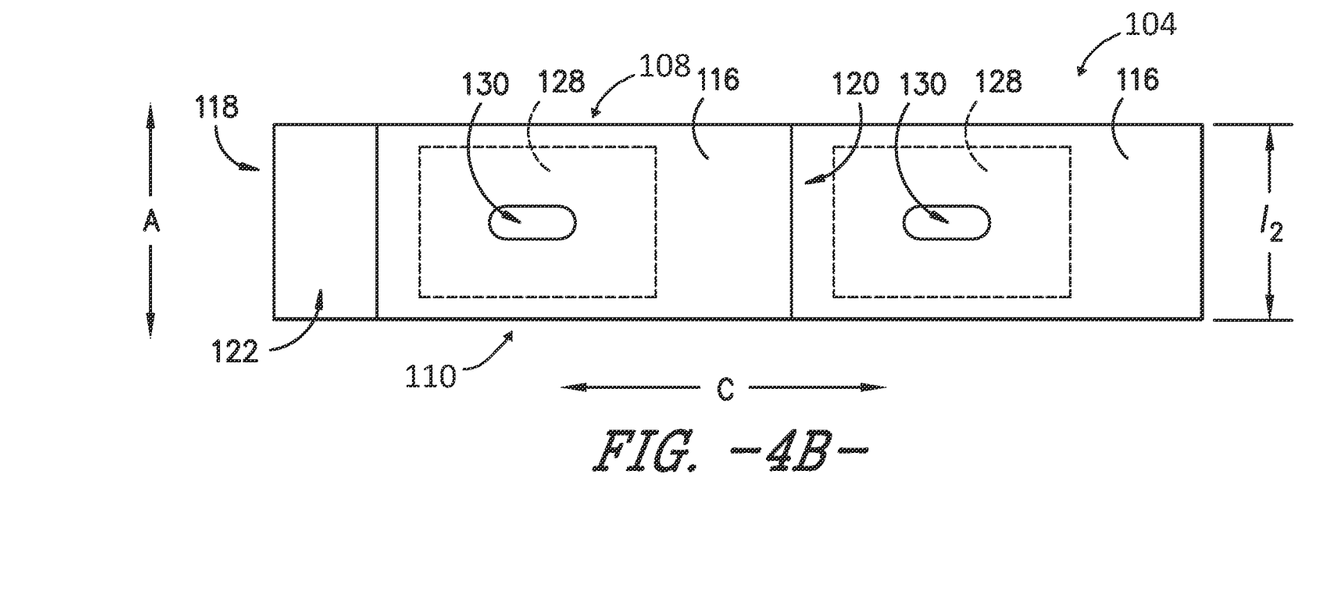
FIG. 4B provides a schematic top view of the metallic panel of FIG. 4A and an adjacent interlocking metallic panel.

Referring to FIGS. 4A and 4B, in some embodiments, the metallic shell 104 comprises a plurality of metallic panels 116. The metallic panels 116 are joined circumferentially to form the annular metallic shell 104. More specifically, each metallic panel 116 comprises a first end 118 circumferentially spaced apart from a second end 120. The plurality of metallic panels 116 interlock along their respective first and second ends 118, 120 to form the annular metallic shell 104. That is, the plurality of metallic panels 116 interlock along an axial length $l_2$ at various circumferential locations of the metallic shell 104.

Keeping with FIGS. 4A and 4B, each of the first end 118 and the second end 120 of each metallic panel 116 defines a groove 122 extending along the axial direction A and the circumferential direction C such that adjacent metallic panels 116 of the plurality of metallic panels 116 contact one another along their grooves 122 to interlock along their first and second ends 118, 120. Stated differently, each metallic panel 116 defines a first groove 122a at its first end 118 and a second groove 122b at its second end 120. The first groove 122a of a first metallic panel 116 interlocks with the second groove 122b of a second metallic panel 116 adjacent the first end 118 of the first metallic panel 116. Further, the second groove 122b of the first metallic panel 116 interlocks with the first groove 122a of a third metallic panel 116 adjacent the second end 120 of the first metallic panel 116. The mating grooves 122, similar to half lap joints, thus define projections and recesses that overlap to interlock the metallic panels 116. In this way, adjacent metallic panels 116 are joined together about the circumference of the containment case 50 to form the metallic shell 104.

When the metallic shell 104 is defined by a plurality of metallic panels 116, the composite and metallic shells 102, 104 and/or 106, 104 may be joined at a location along the metallic panels 116 that is away from the ends 118, 120 of the panels 116 and/or the edges 108, 110 of the metallic shell 104. Generally, the metallic panels 116 may be joined to the composite shell 102, 106 at or near the middle of the panel 116, i.e., not at the interlock locations (ends 118, 120) and not near the panel edges that define the edges 108, 110 of the metallic shell 104. For instance, each metallic panel 116 may comprise an attachment zone 128. A respective attachment mechanism 124 of the plurality of attachment mechanisms 124 (FIG. 3) may be disposed or located within the attachment zone 128 when attached to the composite shell 102, 106. The attachment zone 128 is defined longitudinally inward with respect to each of the first end 118 and the second end 120 of the metallic panel 116 and laterally inward with respect to the edges 108, 110.

Moreover, to accommodate any thermal expansion that may occur, at least one of the composite shell 102, 106 and the plurality of metallic panels 116 may define a plurality of slots 130. Each slot 130 corresponds to a respective attachment mechanism 124 of the plurality of attachment mechanisms 124. For example, each attachment mechanism 124 may extend through a respective slot 130 of the plurality of slots 130, where each slot 130 is defined in a respective metallic panel 116 of the plurality of metallic panels 116. Additionally or alternatively, the composite shell 102, 106 may define a plurality of slots 130 corresponding to the plurality of attachment mechanisms 124, and each attachment mechanism 124 may extend through a respective slot 130 defined in the composite shell 102.

It will be appreciated that the grooves 122 and the slots 130 may be dimensioned to accommodate thermal growth of the shells 102, 104, 106, and particularly of the metallic shell 104, during operation of the turbofan engine 10. More specifically, temperatures within the engine 10 may change during operation of the engine 10, and components such as the fan containment case 50 may expand or contract over a period of use, depending on the change in temperature of the component's environment. In particular, at elevated temperatures, the composite shells 102, 106 and the metallic shell 104 may expand, and the rate of expansion or thermal growth may be different, with the metallic shell 104 typically expanding at a lower temperature or at a higher rate than the composite shells 102, 106. Thus, to account for such thermal growth, including differential thermal growth between the composite and metallic segments, features such as the grooves 122 and the slots 130 that are part of an interface between mating parts may be dimensioned to allow relative movement between the mating parts to mitigate the effects of thermal growth. As an example, each slot 130 may be an elongated opening, such as a discorectangle (also known as a stadium or obround), rather than a circular opening to allow relative movement between the composite shell 102, 106 and the metallic shell 104 when the shells 102, 104 and/or 104, 106 are joined together. Further, the plurality of metallic panels 116, which interlock at various circumferential locations along their grooves 122, account for thermal growth by allowing relative movement between adjacent panels 116.

As shown in the exemplary embodiments illustrated in FIGS. 2-4B, the metallic shell 104 is disposed radially adjacent the plurality of fan blades 40. That is, the metallic shell 104 is disposed radially outward from the tips 41 of the plurality of fan blades 40 such that the metallic shell 104 is positioned adjacent the fan blades 40. In some embodiments, as depicted in FIG. 2, an abradable layer such as trench filler 51 may be disposed between the metallic shell 104 and the fan blades 40, but the metallic shell 104 is still positioned radially outward from or above the fan blades 40. As such, the metallic shell 104 is disposed in the fan containment case 50 to reinforce the case 50 at the location of the blades 40, and one or more composite shells 102, 106 define the remainder of the case 50, including the inner surface 112 upstream and downstream of the metallic shell 104, i.e., the case 50 comprises composite material upstream and downstream of the metallic shell 104. It will be appreciated that the metallic shell 104 may be disposed at other axial locations within the case 50, such as an axial location downstream from the fan blades 40, to optimize reinforcement of the case 50. More particularly, through testing, analysis of FBO events, etc., one or more zones that are axially spaced apart from one another may be identified as having a greater potential for impact by an object than a remainder of the fan containment case 50, and a metallic shell 104 may be disposed in each of these zones. Further, in some embodiments, the fan containment case 50 may comprise more than one metallic shell 104. For example, a first metallic shell 104 may be disposed radially outward from the fan blades 40 and a second metallic shell 104 may be disposed at an axial location downstream from the fan blades 40, with the first composite shell 102 or the second composite shell 106 disposed between the first and second metallic shells 104. Of course, in embodiments in which the hybrid composite component is not a fan containment case, the position or location of the metallic shell 104 within the assembly of shells 102, 104, 106 may be determined based on testing, evaluation of damaging events, or other analysis that indicates where the component should be reinforced. It will be appreciated that utilizing the metallic shell 104 locally, e.g., at those locations having a greater potential for impact, rather than for the entire case 50 allows optimization of the weight of the system while also optimizing impact resistance. That is, applying the metallic material locally rather than globally reduces the weight of the case 50, as the composite material is typically lighter than the metallic material.

A variety of metals, including metal alloys at the like, may be used for the metallic shell 104. In exemplary embodiments, the metallic shell 104 comprises an aluminum-lithium (Al—Li) alloy. In other exemplary embodiments, the metallic shell 104 comprises steel, and in yet other exemplary embodiments, the metallic shell 104 comprises titanium (Ti). For instance, a single piece metallic shell 104 may be formed from an Al—Li alloy, or the plurality of metallic panels 116 that form a metallic shell 104 may be formed from an Al—Li alloy. As other examples, a single piece metallic shell 104 may be formed from steel or titanium, or the plurality of metallic panels 116 that form a metallic shell 104 may be formed from steel or titanium. Other metals may be used as well, and in some embodiments, the metallic shell 104 also may include a protection layer or coating, such as a galvanic protection layer, to inhibit corrosion, etc. of the metallic material.

Similarly, a variety of composite materials may be used for the composite shells 102, 106. For instance, each composite shell 102, 106 may be formed from layers of a PMC material, which includes reinforcing fibers, such as carbon, glass, or aromatic polyamide fibers, disposed within a matrix material, such as a resin or other PMC matrix as described elsewhere herein. The fibers may be manipulated into any common form to fashion the composite shell 102, 106. For instance, the plurality of reinforcing fibers may be woven into a textile (e.g., formed as a fabric), braided, stitched, or manipulated into a three-dimensional weave. It will be appreciated that any suitable common form for PMC and/or CMC materials may be used to form the composite shells 102, 106.

As shown in FIGS. 2 and 3, the metallic shell 104 may be wider (along the axial direction A) at the inner surface 112 than at a radially outermost surface 132 of the metallic shell 104. That is, the metallic shell 104 may have its greatest axial width or length at the inner surface 112 of the containment case 50 and its smallest axial width or length at the radially outermost surface 132 of the metallic shell 104. Further, a thickness t of the metallic shell 104 may vary along the axial direction A. For instance, the metallic shell 104 may be thickest directly above the fan blades 40 and may be thinner at axial locations of the metallic shell 104 upstream and downstream of the fan blades 40.

In some embodiments, the fan containment case assembly 100 also includes the inlet 60 of the fan section 14. As previously described, the inlet 60 is upstream of the fan case 50. As such, the inlet 60 may be formed separately from the fan case 50 and comprise a hybrid composite construction, including a composite shell and a metallic shell, as described herein. With the hybrid composite construction similar to that of the fan case 50, the inlet 60 would also benefit from improved fragment damage resistance. Thus, the damage resistance of the entire fan section 14 can be improved by incorporating the hybrid composite material 102 into the containment casing, e.g., the fan case 50 as well as the inlet 60.

The present subject matter also includes methods for forming a hybrid composite component of a gas turbine engine, such as a hybrid composite fan containment case 50 of a turbofan engine 10. Generally, a method comprises forming a metallic segment; laying up layers of a composite material to form a composite segment; joining the metallic segment and the composite segment to form the hybrid composite component; and processing the hybrid composite component. As described herein, the metallic segment may be a metallic shell 104 that interlocks with a first composite shell 102 and a second composite shell 106 to form the fan containment case 50. As further described herein, in some embodiments, the metallic segment may be a plurality of metallic panels 116 that interlock with one another to form a metallic shell 104 that is attached to and/or interlocks with a composite shell 102 to form the fan containment case 50.

Figure 5:
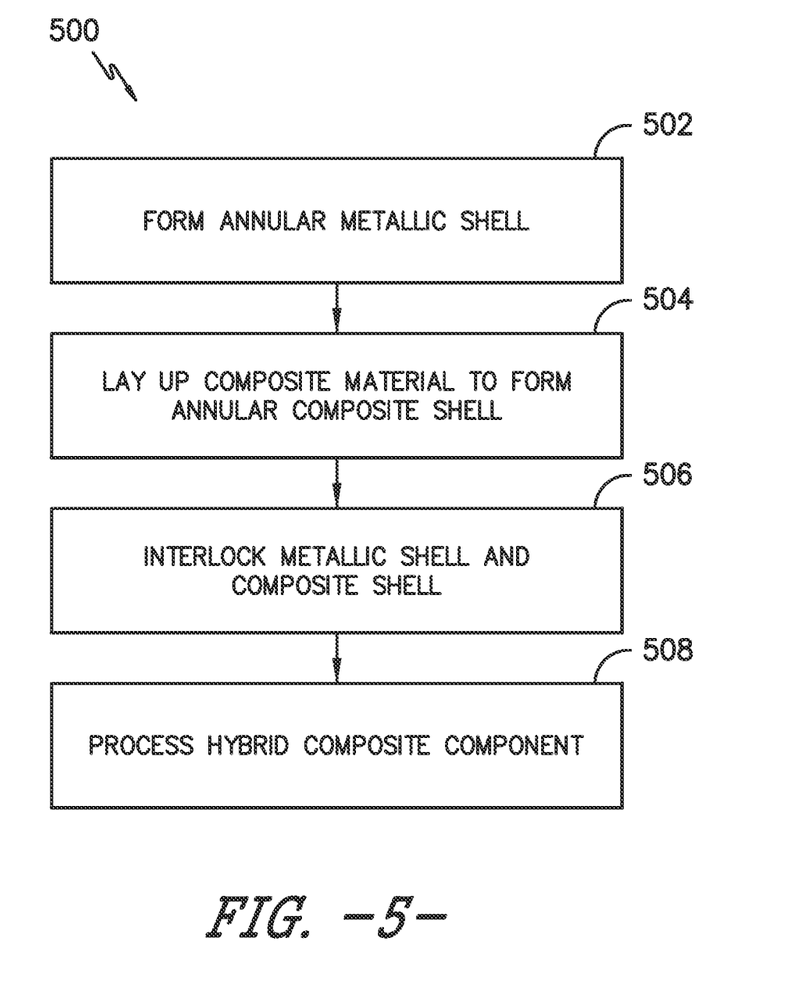
FIG. 5 provides a flow diagram illustrating a method for forming a containment assembly of a gas turbine engine, such as the fan containment case assembly of FIG. 2.

Turning now to FIG. 5, a flow diagram is provided illustrating an exemplary method 500 for forming a hybrid composite component of a gas turbine engine, such as a fan containment case 50 of turbofan engine 10. As shown at 502, the exemplary method 500 includes forming an annular metallic shell 104. The metallic shell 104 may be a single piece structure or may be formed from a plurality of metallic panels 116, e.g., as described with respect to FIGS. 4A and 4B. Referring to 504 in FIG. 5, the method 500 also includes laying up a composite material to form an annular composite shell 102. The composite material may include reinforcing fibers disposed in a matrix, and in exemplary embodiments, may be a PMC material. In some embodiments, laying up the composite material includes forming an annular first composite shell 102 and an annular second composite shell 106. Further, in some embodiments, the composite material may be laid up around the metallic shell 104 to embed the metallic shell 104 within the composite shell 102 and/or composite shell 106, e.g., along the forward edge 108 and the aft edge 110 of the metallic shell 104.

As shown at block 506 in FIG. 5, the method includes interlocking the metallic shell 104 and the composite shell 102 or interlocking the metallic shell 104 with both the composite shells 102, 106. As described herein with respect to FIG. 2, interlocking the metallic shell 104 and composite shell(s) 102, 106 may comprise positioning the metallic and composite shells such that the shells lock together, or interlocking the shells 102, 104, 106 may comprise integrating the metallic shell 104 with the composite shell(s) 102, 106 during lay up of the composite material.

As shown at 508 in FIG. 5, the exemplary method 500 further includes processing the hybrid composite component. At least in part, processing the hybrid composite layup comprises curing the layup such that the metallic and composite segments are co-cured. That is, the metallic shell 104 and the composite shell 102, or the metallic shell 104 and the composite shells 102, 106, are co-cured. In some embodiments, the hybrid composite component may be resin transfer molded (RTM) or vacuum assisted resin transfer molded (VARTM).

Figure 6:
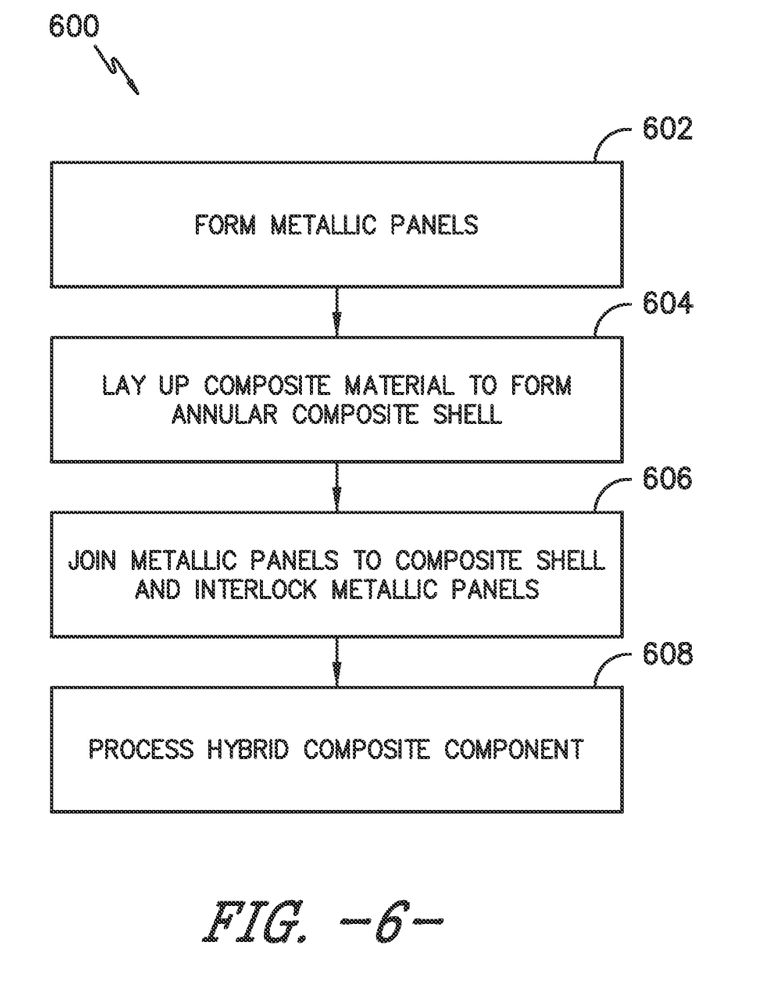
FIG. 6 provides a flow diagram illustrating a method for forming a containment assembly of a gas turbine engine, such as the fan containment case assembly of FIGS. 3 and 4.

Referring now to FIG. 6, a flow diagram is provided illustrating another exemplary method 600 for forming a hybrid composite component of a gas turbine engine, such as a fan containment case 50 of turbofan engine 10. As shown at 602, the exemplary method 600 includes forming a plurality of metallic panels 116, which together define an annular metallic shell 104. More particularly, as described herein with respect to FIGS. 4A and 4B, the metallic shell 104 may be formed from a plurality of interlocking metallic panels 116. It will be appreciated that, as described herein, forming the metallic panels 116 may include defining a plurality of grooves 122 and a plurality of slots 130 in the metallic panels 116.

Like the method 500, the method 600 includes at block 604 laying up a composite material to form an annular composite shell 102. The composite material may include reinforcing fibers disposed in a matrix, and in exemplary embodiments, may be a PMC material. Laying up the composite material may include defining a plurality of slots 130 such that, as described herein, a plurality of slots 130 are defined in the composite shell 102. Further, the composite material may be laid up to define a recess 126 in the composite shell 102 in which the metallic shell 104 may be disposed.

As shown at 606 in FIG. 6, the method 600 also includes joining the metallic panels 116 to the composite shell 102 and interlocking the metallic panels 116. More particularly, in some embodiments, the metallic panels 116 may be interlocked together, e.g., along mating grooves 122, to form the annular metallic shell 104 before attaching the segmented metallic shell 104 to the composite shell 102. In other embodiments, each metallic panel 116 may be attached to the composite shell 102 and the metallic panels 116 interlocked as a next metallic panel 116 is joined to the composite shell 102. The metallic panels 116 or the segmented metallic shell 104 may be joined to the composite shell 102 using a plurality of attachment mechanisms 124, such as bolts, studs, or the like, or by gluing, brazing, etc. the metallic panels 116 or metallic shell 104 to the composite shell 102. In some embodiments, each attachment mechanism 124 may be disposed in or may pass through a respective slot 130, which may be defined in the metallic panels 116 and/or the composite shell 102. It will be appreciated that, in embodiments in which the attachment mechanism is not bolting or the like but gluing, brazing, or similar, the slots 130 may be omitted.

As illustrated at 608 in FIG. 6, the exemplary method 600 further includes processing the hybrid composite component. At least in part, processing the hybrid composite layup comprises curing the layup such that the metallic and composite segments are co-cured. That is, the metallic shell 104 (formed from the metallic panels 116) and the composite shell 102 are co-cured. In some embodiments, the hybrid composite component may be resin transfer molded (RTM) or vacuum assisted resin transfer molded (VARTM).

As described with respect to methods 500 and 600, forming the hybrid composite component may comprise steps similar to those used in forming a composite component, such as a component formed from PMC material. As one example, composite reinforcing fibers may be impregnated with matrix material and the resulting composition cut into layers or plies that are laid up to form the composite shell(s) 102, 106. As another example, the composite reinforcing fibers may be woven, braided, or otherwise manipulated into a three dimensional preform, which may be cut into layers or plies, or a plurality of performs may be constructed, that are laid up to form the composite shell(s) 102, 106. It will be understood that the composite layup may be formed by laying up the composite material (e.g., layers, plies, or preforms) on a tool, mandrel, or other support. Then, when positioned with the metallic shell 104, the composite layup may undergo thermal and/or chemical processing to form the hybrid composite component. For example, the hybrid composite component may be debulked and consolidated, e.g., at elevated temperatures and pressures in an autoclave, before undergoing densification and final curing. As such, the metallic material and composite material are co-cured to produce the hybrid composite component. In some embodiments, processing the hybrid composite component may include a resin transfer molding process or a vacuum assisted resin transfer molding process, such that the resulting hybrid composite component may be referred to as resin transfer molded (RTM) or vacuum assisted resin transfer molded (VARTM). Specific processing techniques and parameters for the thermal and/or chemical processing of the layup will depend on the particular composition of the materials used to form the composite layers, plies, or preforms. As an example, other known methods or techniques for curing composite plies may be utilized.

In embodiments in which the hybrid component is a hybrid fan containment case 50, after the containment case is formed, the other components of the fan containment case assembly 100 may be assembled to form the assembly 100. For instance, in embodiments including a trench filler 51, the trench filler 51 may be joined, attached, or coupled to, or otherwise disposed against, the hybrid fan case 50 to form the fan containment case assembly 100. The assembly 100 may then be slid over the fan 38, or the fan 38 may be inserted or assembled within the fan containment case assembly 100.

Of course, the hybrid component may be another or different component than a fan case. It will be appreciated that the composite shells 102, 106 and metallic shells 104, including metallic panels 116, may be formed as described herein and then used to make or construct one or more gas turbine engine components, in addition to or instead of the fan case 50.

Accordingly, the present subject matter is directed to components, and methods of forming components, comprising metal and composite material, which may be referred to as metal and composite hybrid components. As described herein, metallic shells or panels interlocked with composite segments may increase the strength and/or energy absorption of the component without unduly increasing the weight and/or cost of the component, e.g., compared to a component formed from separate metallic and composite material sections, a completely metallic component, or a completely composite component. Such metal and composite hybrid fan casings or containment systems may be formed, e.g., to improve blade containment in a fan blade-out event. More particularly, the present subject matter provides fan containment case assemblies, and methods for forming such assemblies, that utilize interlocking metallic shells or panels within a composite casing to create hybrid construction fan containment case assemblies. In some embodiments, the hybrid construction may comprise interlocking metallic and composite shells, and in other embodiments, the hybrid construction may comprise a plurality of interlocking metallic panels attached to a composite casing. In any case, the hybrid structure, comprising metallic segments disposed in potentially vulnerable locations, such as radially outward from fan blade tips, can have high strength and can help in energy absorption in the event of fan blade out (FBO), which may help contain a fan blade and/or its fragments in an FBO event. Further, the hybrid structure has a reduced weight and cost compared to, e.g., an all carbon fan case. Other benefits and advantages of the present subject matter may be realized as well.

Further aspects of the invention are provided by the subject matter of the following clauses:

A containment assembly of a gas turbine engine comprising a containment case extending along an axial direction about a longitudinal centerline of the gas turbine engine, the containment case having an inner surface and an outer surface spaced apart along a radial direction, the containment case including an annular composite shell joined with an annular metallic shell, wherein the metallic shell defines a first portion of the inner surface and the composite shell defines a second portion of the inner surface.

The containment assembly of any preceding clause, wherein the metallic shell interlocks with the composite shell along a circumferential direction.

The containment assembly of any preceding clause, wherein the composite shell is a first composite shell and the containment case further includes a second composite shell, wherein the metallic shell comprises a forward edge and an aft edge, and wherein the first composite shell interlocks with the metallic shell along the forward edge and the second composite shell interlocks with the metallic shell along the aft edge.

The containment assembly of any preceding clause, wherein an edge of the metallic shell is embedded within the composite shell.

The containment assembly of any preceding clause, wherein the metallic shell defines at least a portion of the outer surface of the containment case.

The containment assembly of any preceding clause, wherein the metallic shell comprises a plurality of metallic panels, each metallic panel comprising a first end circumferentially spaced apart from a second end, and wherein the plurality of metallic panels interlock along their respective first and second ends to form the annular metallic shell.

The containment assembly of any preceding clause, wherein each of the first end and the second end of each metallic panel of the plurality of metallic panels defines a groove extending along the axial direction and the circumferential direction such that adjacent metallic panels of the plurality of metallic panels contact one another along their grooves to interlock along their first and second ends.

The containment assembly of any preceding clause, wherein the containment case further includes a plurality of attachment mechanisms, each attachment mechanism disposed between the composite shell and the metallic shell to join the composite shell and the metallic shell.

The containment assembly of any preceding clause, wherein each metallic panel of the plurality of metallic panels comprises an attachment zone, the respective attachment mechanism of the plurality of attachment mechanisms disposed within the attachment zone, and wherein the attachment zone is defined longitudinally inward with respect to each of the first end and the second end of the respective metallic panel.

The containment assembly of any preceding clause, wherein the plurality of attachment mechanisms comprises a plurality of bolts.

The containment assembly of any preceding clause, wherein at least one of the composite shell and the plurality of metallic panels defines a plurality of slots, each slot corresponding to a respective attachment mechanism of the plurality of attachment mechanisms.

The containment assembly of any preceding clause, wherein the metallic shell is recessed within the composite shell such that the composite shell defines the outer surface of the containment case.

The containment assembly of any preceding clause, wherein the containment assembly surrounds a plurality of fan blades attached to a disk, each fan blade of the plurality of fan blades extending along a radial direction, and wherein the disk is rotatable about the longitudinal centerline.

The containment assembly of any preceding clause, wherein the metallic shell is disposed radially adjacent the plurality of fan blades.

The containment assembly of any preceding clause, further comprising a trench filler joined to the containment case, the trench filler disposed radially inward of the containment case such that the trench filler is disposed along the radial direction between the containment case and the plurality of fan blades.

A hybrid composite component of a gas turbine engine comprising an annular composite shell; and an annular metallic shell joined with the composite shell, wherein at least one segment of the metallic shell interlocks with the composite shell or another segment of the metallic shell along an axial length.

The hybrid composite component of any preceding clause, wherein the at least one segment of the metallic shell interlocks with the composite shell along the axial length, wherein the hybrid composite component comprises an inner surface spaced apart from an outer surface along a radial direction, and wherein the metallic shell defines a portion of the inner surface and a portion of the outer surface.

The hybrid composite component of any preceding clause, wherein the metallic shell comprises a plurality of interlocking metallic panels, wherein the at least one segment of the metallic shell is a respective panel of the plurality of interlocking metallic panels which interlocks with an adjacent metallic panel along the axial length, and wherein the metallic shell is disposed in a recess defined by the composite shell.

The hybrid composite component of any preceding clause, wherein the hybrid composite component is a fan containment case assembly surrounding a plurality of fan blades attached to a disk, each fan blade of the plurality of fan blades extending along a radial direction, the disk is rotatable about a longitudinal centerline of the gas turbine engine, and wherein the metallic shell defines an inner surface of the hybrid composite component disposed radially adjacent the plurality of fan blades.

A method for forming a hybrid composite component of a gas turbine engine comprising forming a metallic segment; laying up layers of a composite material to form a composite segment; joining the metallic segment and the composite segment to form the hybrid composite component; and processing the hybrid composite component.

The method of any preceding clause, wherein the metallic segment is an annular metallic shell.

The method of any preceding clause, wherein the composite segment is an annular composite shell.

The method of any preceding clause, wherein joining the metallic segment and the composite segment comprises laying up the composite material around the metallic segment to embed the metallic segment within the composite segment.

The method of any preceding clause, wherein joining the metallic segment and the composite segment comprises interlocking the metallic segment and the composite segment.

The method of any preceding clause, further comprising laying up layers of the composite material to form a second composite segment; and joining the metallic segment and the second composite segment to form the hybrid composite component.

The method of any preceding clause, wherein processing the hybrid composite component comprises co-curing the metallic segment and the composite segment.

The method of any preceding clause, wherein processing the hybrid composite component comprises resin transfer molding the hybrid composite component.

The method of any preceding clause, wherein processing the hybrid composite component comprises vacuum assisted resin transfer molding the hybrid composite component.

The method of any preceding clause, wherein the metallic segment comprises a plurality of metallic panels that together define an annular metallic shell.

The method of any preceding clause, further comprising forming the plurality of metallic panels.

The method of any preceding clause, wherein joining the metallic segment and the composite segment comprises interlocking the plurality of metallic panels and joining the interlocked metallic panels to the composite segment.

The method of any preceding clause, wherein a plurality of attachment mechanisms are used to join the metallic segment and the composite segment.

The method of any preceding clause, wherein forming the plurality of metallic panels includes defining a plurality of grooves and a plurality of slots in the plurality of metallic panels.

The method of any preceding clause, wherein laying up the composite material includes defining a plurality of slots such that a plurality of slots are defined in the composite segment.

The method of any preceding clause, wherein laying up the composite material includes defining a recess in the composite segment.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A containment assembly of a gas turbine engine, the gas turbine engine having a fan section including a plurality of fan blades, the containment assembly comprising:
    a containment case located within the fan section and at least partially encasing the plurality of fan blades, the containment case extending along an axial direction about a longitudinal centerline of the gas turbine engine, the containment case having an inner surface confronting the plurality of fan blades and an outer surface, opposite the inner surface, defining a radially outermost surface of the containment case, the containment case comprising:
        a first composite shell defining a first portion of the outer surface, and
        a metallic shell defining a second portion of the outer surface, the metallic shell being at least partially axially aligned with the plurality of fan blades;
        wherein the metallic shell interlocks with the first composite shell.

2. The containment assembly of claim 1, further comprising a second composite shell defining a third portion of the outer surface.

3. The containment assembly of claim 2, wherein the metallic shell comprises a forward edge and an aft edge, and wherein the first composite shell interlocks with the metallic shell along the forward edge and the second composite shell interlocks with the metallic shell along the aft edge.

4. The containment assembly of claim 3, wherein the forward edge is embedded within the first composite shell and the aft edge is embedded within the second composite shell.

5. The containment assembly of claim 1, wherein an edge of the metallic shell is embedded within the first composite shell.

6. The containment assembly of claim 5, wherein the first composite shell interlocks with the metallic shell along a first axial length.

7. The containment assembly of claim 6, wherein the first composite shell defines the first portion of the outer surface along the first axial length.

8. The containment assembly of claim 7, wherein the second portion of the outer surface of the containment case is located downstream from the first portion of the outer surface.

9. The containment assembly of claim 8, further comprising a second composite shell defining a third portion of the outer surface, wherein the third portion of the outer surface is downstream from the second portion of the outer surface.

10. The containment assembly of claim 9, wherein the metallic shell defines the inner surface at a location radially spaced from the first portion, the second portion, and the third portion of the outer surface.

11. The containment assembly of claim 1, wherein the metallic shell comprises a plurality of metallic panels, each metallic panel of the plurality of metallic panels comprising a first end circumferentially spaced apart from a second end, and wherein the plurality of metallic panels interlock along their respective first and second ends to form the metallic shell.

12. The containment assembly of claim 11, wherein each of the first end and the second end of each metallic panel of the plurality of metallic panels defines a groove extending along the axial direction and the circumferential direction such that adjacent metallic panels of the plurality of metallic panels contact one another along their grooves to interlock along their first and second ends.

13. The containment assembly of claim 1, wherein the containment assembly surrounds a plurality of fan blades attached to a disk, each fan blade of the plurality of fan blades extending along the radial direction, and wherein the disk is rotatable about the longitudinal centerline.

14. The containment assembly of claim 13, wherein the metallic shell is disposed radially adjacent the plurality of fan blades.

15. The containment assembly of claim 13, further comprising:
a trench filler joined to the containment case, the trench filler disposed radially inward of the containment case such that the trench filler is disposed along a radial direction between the containment case and the plurality of fan blades.

16. A hybrid composite component of a gas turbine engine, the gas turbine engine having a fan section including a plurality of fan blades, the hybrid composite component comprising:
a casing located within the fan section and at least partially encasing the plurality of fan blades, the casing extending between a first end and a second end to define an axial direction, the casing having an inner surface confronting the plurality of fan blades and an outer surface, opposite the inner surface, spaced apart along a radial direction, defining a radially outermost surface of the casing, the casing having a first portion with a first axial length and a second portion with a second axial length;
a first annular composite shell defining an outer part of the first portion; and
an annular metallic shell defining an inner part of the first portion and a respective portion of the outer surface, the annular metallic shell being at least partially axially aligned with the plurality of fan blades;
wherein at least one segment of the annular metallic shell interlocks with the first annular composite shell along the first axial length.

17. The hybrid composite component of claim 16, wherein the casing comprises an inner surface spaced apart from an outer surface along a radial direction, and wherein the outer part of the first portion defines the outer surface along the first axial length.

18. The hybrid composite component of claim 17, wherein the inner part of the first portion defines the inner surface along the first axial length.

19. The hybrid composite component of claim 18, wherein the annular metallic shell defines an outer surface and an inner surface along a second axial length.

20. The hybrid composite component of claim 16, wherein the casing is a fan containment case assembly surrounding a plurality of fan blades attached to a disk, each fan blade of the plurality of fan blades extending along a radial direction, the disk is rotatable about a longitudinal centerline of the gas turbine engine, and wherein the annular metallic shell defines an inner surface of the hybrid composite component along at least the second axial length disposed radially adjacent the plurality of fan blades.

* * * * *